United States Patent [19]
Pintos et al.

[11] Patent Number: 4,754,475
[45] Date of Patent: Jun. 28, 1988

[54] CALLING LINE TRACING SYSTEM AND IDENTIFICATION DETECTOR

[75] Inventors: Jose P. Pintos; Jose D. M. Catoira; Affonso F. Da Costa Ribeiro Neto, all of Brasileia, Brazil

[73] Assignee: Sonintel Sociedade Nacional de Industria de Telecomunicacoes Ltda., Brazil

[21] Appl. No.: 76,315

[22] Filed: Jul. 22, 1987

Related U.S. Application Data

[63] Continuation-in-part of Ser. No. 865,917, May 13, 1986, which is a continuation of Ser. No. 595,746, Apr. 2, 1984, which is a continuation-in-part of Ser. No. 406,152, Aug. 9, 1982.

[30] Foreign Application Priority Data

Oct. 2, 1981 [BR] Brazil .................... 8106464

[51] Int. Cl.⁴ .................... H04M 1/57; H04Q 3/72
[52] U.S. Cl. .................... 379/142; 379/247; 379/249
[58] Field of Search .................... 379/142, 249, 247

[56] References Cited

U.S. PATENT DOCUMENTS

| | | | |
|---|---|---|---|
| 4,071,699 | 1/1978 | Jovic et al. ........... | 379/142 |
| 4,242,539 | 12/1980 | Hashimoto ........... | 379/142 |
| 4,445,001 | 4/1984 | Bertoglio ........... | 379/183 |
| 4,591,665 | 5/1986 | Foster et al. ........... | 379/142 |

FOREIGN PATENT DOCUMENTS

| | | | |
|---|---|---|---|
| EP082512 | 6/1983 | European Pat. Off. ........... | 379/142 |
| 2714401 | 10/1978 | Fed. Rep. of Germany . | |
| 1514198 | 1/1968 | France . | |
| 2183442 | 12/1973 | France . | |
| 2379951 | 9/1978 | France . | |
| 0145408 | 12/1978 | Japan ........... | 379/142 |
| 0140806 | 11/1979 | Japan ........... | 379/142 |
| 0154914 | 12/1979 | Japan ........... | 379/142 |
| 55-83367 | 6/1980 | Japan ........... | 379/249 |
| 55-79544 | 6/1980 | Japan ........... | 379/249 |
| 56-13862 | 2/1981 | Japan ........... | 379/142 |
| 57-45766 | 3/1982 | Japan ........... | 379/247 |
| 0027658 | 2/1984 | Japan ........... | 379/249 |

*Primary Examiner*—Thomas W. Brown
*Attorney, Agent, or Firm*—Browning, Bushman, Zamecki & Anderson

[57] ABSTRACT

A detector identification device is provided on the premises of the called telephone station capable of detecting network telephone signals, converting them to digital signals and displaying the digital signals. The device is also capable of providing ringing and other calling signals to the called telephone station. The telephone exchange serving the called telephone station is programmed to initiate a back signaling process to the exchange serving the calling telephone station. In addition, the device transmits back signals used to request and thus complete the identification of the calling telephone station from the telephone network.

8 Claims, 7 Drawing Sheets

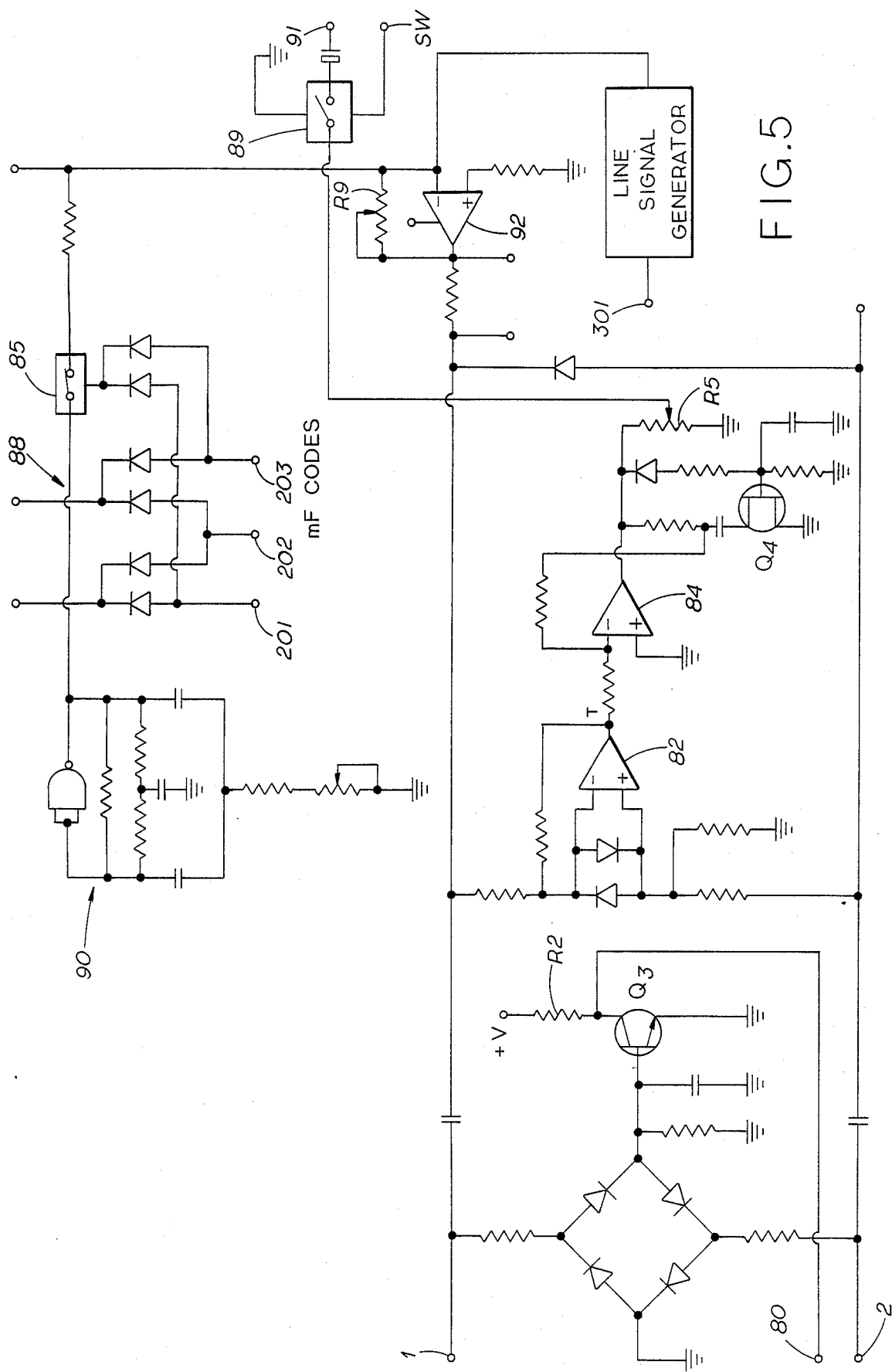

CALLING LINE TRACING SYSTEM AND IDENTIFICATION DETECTOR

RELATED APPLICATIONS

This application is a continuation, at least in part, of U.S. patent application Ser. No. 865,917, filed May 13, 1986, which was a continuation of U.S. patent application Ser. No. 595,746 filed Apr. 2, 1984, which was a continuation-in-part of U.S. patent application Ser. No. 406,152 filed Aug. 9, 1982.

CLAIM OF PRIORITY

The Applicants claim priority based upon their Brazilian patent application Ser. No. 8106464, filed Oct. 2, 1981, now Brazilian Pat. No. 8106464, granted on Dec. 30, 1986.

BACKGROUND OF THE INVENTION

1. Field of the Invention

This invention relates to telephone networks or systems and concerns a system suitable for the immediate identification of the identity number of a calling station A on a called station B which may be connected through any number of intermediate automatic exchanges in a telephone network within a country or political area and even on a worldwide basis if the necessary agreements between countries have been previously made.

2. Description of the Background

Ever since the introduction of automatic telephone exchanges, there have been repeated attempts to find a simple and fast method, enabling one to detect the identity number of a calling station A at a remotely located called station B, an objective being to eliminate, or at least reduce, the possibility of malicious anonymous calls, which sometimes, as in the case of bomb threats or other terrorist activities, is not only desirable but a real need.

The present invention covers and claims improvements made by the corporation, which have allowed it to develop a complete system and complementary hardware, applicable to any kind and in any number, and which includes the necessary programming or software, as well as the basic characteristics of the essential circuit blocks of the complementary hardware. The result is a call tracing system and identification detector which can immediately indicate, upon receiving a telephone call at a called station, not only the identification number of the caller but also the type of subscriber, for example, regular, public telephone or other (given by the category) and the location of the calling station, given by the area code or the country code in the case of international calls.

Many prior art arrangements have been proposed to identify calling stations connected with called stations and attendant positions through automatic exchanges. These systems are based on several different principles and generally they are only applicable to special cases, as they introduce additional complications in the network and the expense is such that it hardly allows the development of a product within the reach of the ordinary telephone subscriber. Usually, they are based on one or more of the following methods:

Introduction of strange additional signaling in the telephone network.

Operation of a switch or electrical connection to start the identification process.

Use of alternative routes to trace the calling station.

Use of additional devices at the local exchange, which very often is not possible for the simple reason of the space available, independently of the costs that might be incurred.

Usually, they entail a risk of interference with the regular telephone exchange control signaling.

As a general rule, an ideal system for identifying calling stations should have the following characteristics:

It should not require any modifications at the calling station.

It should not be detectable by the calling party to avoid alerting it that it is being identified.

It should allow, if desired, immediate identification of the calling station by the single fact of receiving a call at the called station, without even lifting the receiver.

It should preferably not introduce any strange signaling in the telephone network, that is, it should not use any other signaling than that of the telephone network itself, to avoid any possibility of interfering with its regular operation.

It should not require the installation of any additional devices in the switching exchanges of the telephone system.

The hardware to be used at the called station should occupy minimum space and even offer the possibility of being incorporated in the subscriber set as an integral part of it.

It should allow the development of a type of hardware which requires the previous knowledge of the called subscriber for it to be installed, in order to comply with any existing regulations on the Right of Privacy.

As a complement to the previous condition, if connected without the knowledge of the private subscriber, it should not operate nor interfere with the operation of the telephone network.

It should not be possible to install it without the cooperation and knowledge of the telephone operating company, to ensure not only full compatibility with the regular operation of the network but also as an additional guarantee for private subscribers.

It should allow commercial production at a sufficiently low price for it to be within the reach of any subscriber and not only of official institutions or major corporations.

This invention seeks to provide a system which for the first time fulfills some or all of these conditions.

SUMMARY OF THE INVENTION

The objects of the invention are accomplished, generally, by the provision of methods, apparatus and systems which provide to a called telephone station the identity of a calling telephone station, characterized in that the incoming telephone exchange serving the called telephone exchange is programmed to initiate a process for identifying the calling telephone station, and then allows the called telephone station to complete the identification process.

As an additional feature, after the incoming telephone exchange initiates the identification process, it disengages itself from the calling process, and transfers the completion of the calling process to the called telephone station.

As a further feature of the invention, a special detector identification unit is described for installation on the premises of the called telephone station to provide the completion of the call and the identification of the calling telephone station.

The system is composed basically of a subscriber terminal or called station designated with a special category at its local exchange, an identification detector connected to the subscriber line and a network of telephone exchanges programmed to send the identification of the calling station to the detector if, and only if, the addressed called station has been designated with a special category, in such a way that a clandestine installation of a detector will not only not operate, but will not affect in any way the telephone line or the telephone network in general.

The called station line where the detector is connected is characterized in that it has been designated at its local exchange with a special category and the telephone exchange system is characterized in that it has been programmed not only to change the regular sequence of call control signaling, but also to transfer and disengage automatically its control unit from the call process, which is passed over temporarily to the detector in those special cases where it receives a call addressed to a line equipped with a detector, but to operate normally in all other cases.

BRIEF DESCRIPTION OF THE DRAWINGS

FIG. 5 illustrates, schematically, the sensor and frequency generator circuits of FIG. 4;

DETAILED DESCRIPTION OF THE PREFERRED EMBODIMENT

Figure 1:
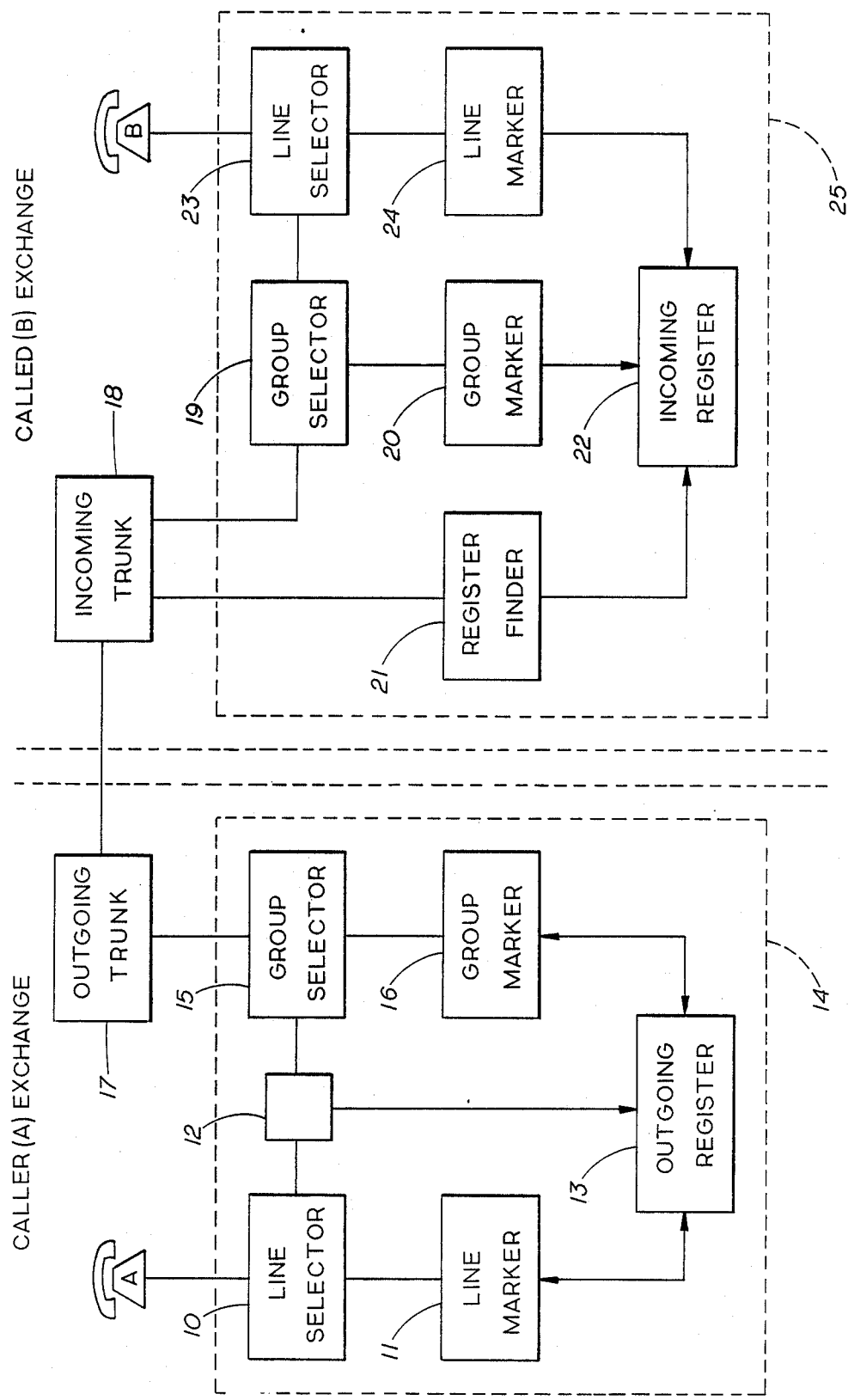
FIG. 1 is a block diagram, schematic view of a prior art telephone system involving a telephone A, with its outgoing exchange, calling a telephone B, with its incoming exchange.

Referring now to FIG. 1 of the drawings, there is illustrated in block diagram a conventional, well-known telephone system in which telephone A calls telephone B. The telephone A is connected through a line selector circuit 10, marked by a line marker 11, to a switching junction 12, which in turn is connected to an outgoing register 13 in the local exchange 14 for telephone A. The switching junction 12 is also connected to a group selector circuit 15, marked by a group marker 16, whose output is connected to an outgoing trunk 17.

An incoming trunk 18 is connected to a register finder 21 and to a group selector 19, marked by a group marker 20. The register finder 21 is connected to an incoming register 22 in the exchange 25 for telephone B and the output of the group selector 19 is connected to an input of a line selector 23 controlled by line marker 24. The line selector 23 is connected to telephone B, all as is well known in the prior art.

Figure 2:
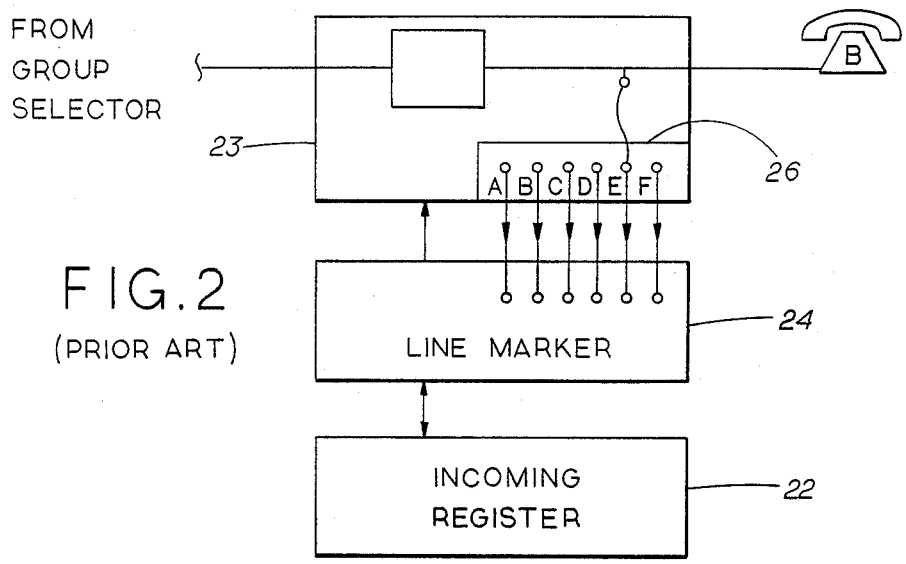
FIG. 2 is an expanded view, shown in block diagram, of a portion of the prior art incoming exchange illustrated in FIG. 1.

Referring now to FIG. 2, a section of the prior art system illustrated in FIG. 1 is shown in greater detail. Specifically, the line selector circuitry 23 includes a conventional subscriber class identification circuit 26 having a plurality of outputs 26A-26F. The actual number of subscriber classes can be any number, with six such classes being shown only for purposes of illustration. In this illustration of a conventional system, telephone B is representative of a standard class, residential users, and is connected through the subscriber class terminal 26E. Other subscriber classes might be coin boxes, operator terminals, etc. The line marker 24 marks the particular subscriber being called and provides special subscriber class information, also referred to in a more general way as a specific terminating class mark, to the incoming register 22, all as is well known in the art.

In the operation of the prior art system illustrated in FIGS. 1 and 2, especially when using the conventional European system, sometimes referred to as an R-2 signaling system, the user of telephone A dials the number of telephone B. In the R-2 signaling system of forward and backward signals, there are combinations of six frequencies used in the forward signals and other combinations of six different frequencies used in the backward signals.

| Forward | Backward |
|---|---|
| $f_0$ 1380 Hz | $f_0$ 1140 Hz |
| $f_1$ 1500 Hz | $f_1$ 1020 Hz |
| $f_2$ 1620 Hz | $f_2$ 900 Hz |
| $f_4$ 1740 Hz | $f_4$ 780 Hz |
| $f_7$ 1860 Hz | $f_7$ 660 Hz |
| $f_{11}$ 1980 Hz | $f_{11}$ 540 Hz |

These signals are used for transmitting backward and forward information, data and requests between the registers to provide the proper operations during the progress of each call. For instance, the outgoing register sends a pair of forward or high frequencies each time it wants to inform to incoming register about new data of the called party (number, class, etc.). Each pair of frequencies will define a different signal. The incoming register will send back a pair of backward or low frequencies each time it wants to communicate something to the outgoing register. For instance, after each digital or signal of the called party received from the outgoing register, the incoming register will send back the digit "1," also called signal "A-1," informing that the signal has been received and asking for another signal. This is a normal procedure well known in the art and defined in the CCITT rules for R-2 signaling systems.

Each forward and each backward signal is a combination of two of the above-listed frequencies. For example, the forward going signal for the digit "1" is a combination of $f_0$ and $f_1$.

The local exchange 14 does several things, but for purposes of explaining the present invention, it should be appreciated that the called number of telephone B and the calling number of telephone A are both stored in outgoing register 13. In addition, the group selector circuitry 15 determines which outgoing trunk should be used for the area code and exchange 25 associated with telephone B, and thus allows the initial digits of the B telephone number to be routed to the incoming register 22 of exchange 25. After each digit is routed to incoming register 22, the incoming register 22 signals back with an "A-1" signal to the outgoing register 13, meaning "send me another digit." In response to the continuing requests for additional digits, the outgoing register 13 will send forward each of them. As soon as the last digit of the called party has been sent to the incoming register, the incoming register will pass the information to the markers and the called party will be located by called exchange line selector 23. As soon as the called subscriber class is received in the incoming register, the incoming register sends an "A-3" signal back to the outgoing register, indicating that the called has been localized, and the line is now ready for "B" signaling, which provides an indication of information about the condition of telephone B, for example, whether it is free, busy, inoperative or the like.

If needed for billing purposes, in toll transit exchanges, the incoming register will send an "A-5" signal back to the outgoing register before it sends an A-3, the A-5 signal asking for the identity of the calling telephone A, and will continue to send an A-5 signal back to the outgoing register for each additional digit of the number of telephone A until the complete identification is received in a well known manner. This can happen because in the R-2 register signaling systems, the behavior of the outgoing registers and, consequently, the steps of the proceeding calls, are defined by the signals sent back by the incoming registers of each following exchange.

What happens in these systems is that only incoming registers of toll offices have the capability of doing this type of specific signaling. The incoming registers of local exchanges (number 5) typically do not have this capability, but the outgoing registers in the networks with toll ticketing always have the capability of understanding and answering these signals. By using this signaling, the incoming register of a toll transit can obtain from the outgoing register of the originating exchange any data desired of the calling party. The incoming register can obtain that information at any time before sending back an A-3 signal, depending on the general programming of the long distance network. After transmitting the last digit of the calling number, including subscriber class, area code, subscriber number, etc., the outgoing register will send an "I-15" signal combination of $f_7$ plus $f_{11}$ forward frequencies as an indication of the end of the calling party data. Thereafter, incoming register of the toll transit exchange will continue with the normal signaling as well known in the art.

After the A-3 is sent back by the incoming register, and after the B signals are completed, indicating that the B telephone is ready for completion of the call, the incoming register 22, through incoming trunk, and possibly in conjunction with the line selector 23, depending upon the system, causes ringing current to be applied to telephone B. When the telephone B is taken off hook, the voice lines of telephone A are connected to the voice lines of telephone B, thus completing the call, all in a conventional manner.

In understanding the afore-described operation of a prior art telephone system, it can perhaps best be appreciated by referring to the Drawing No. 4952-2261 which covers an incoming register currently in use in the City of Brasilia, Brazil, such drawing being incorporated herein by reference. Drawing No. 4952-2261 was published in two parts by Standard Electrica of Rio De Janeiro, Brazil, Parts 1 and 2 each being published on July 21, 1975, with Part 1 being modified and further published on May 25, 1979. Those skilled in the art, however, will recognize that the same principles are applicable to any conventional, prior art telephone exchange.

After the incoming register has sent the final digits to line marker 24, and it has marked the called subscriber level in the line selectors, the category or subscriber class of this level will be forwarded to the incoming register through five wires in the typical well known two out of five code.

Figure 9:
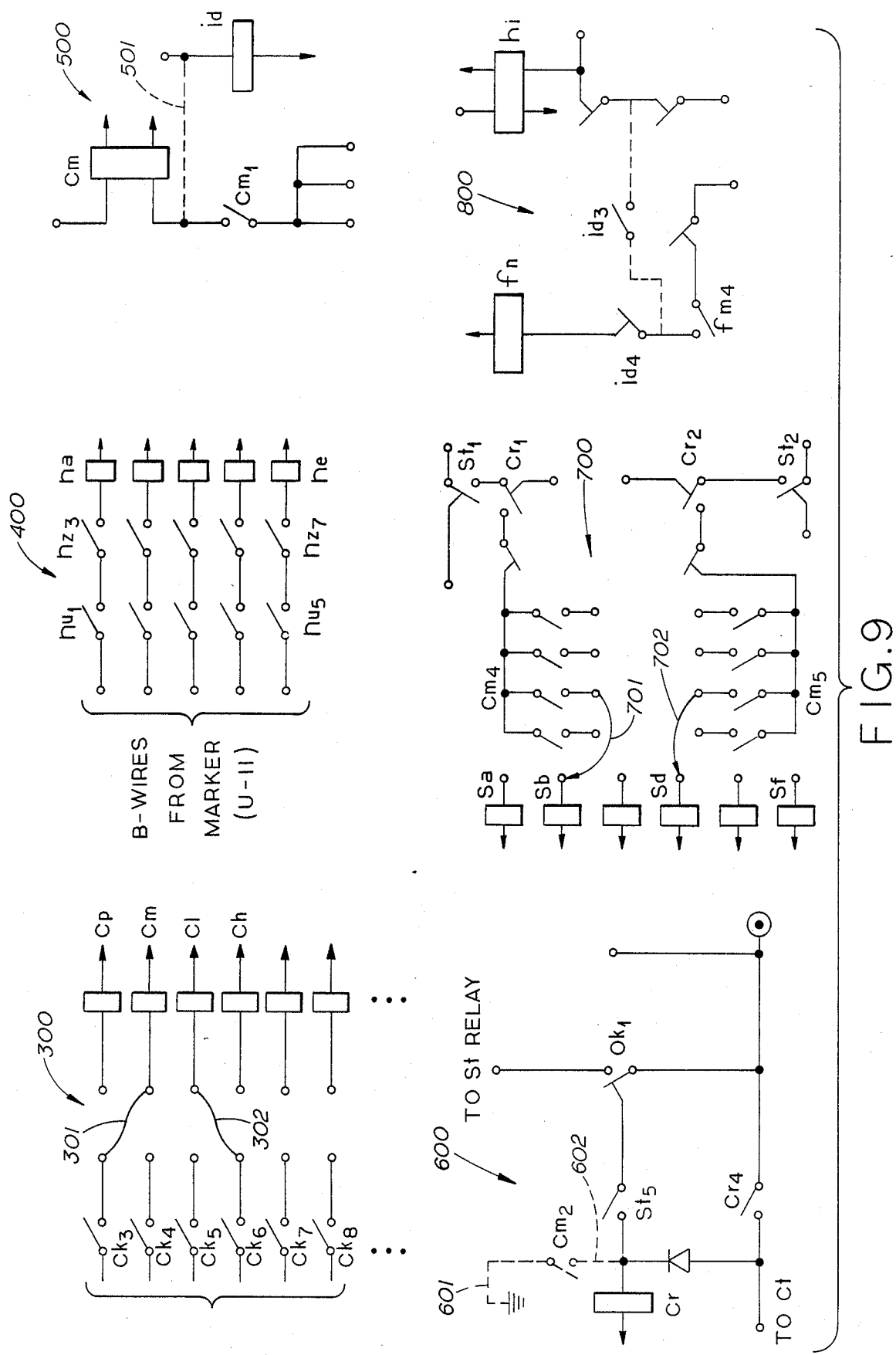
FIG. 9 schematically illustrates the programming of an incoming register in accordance with the present invention.

Referring now to FIG. 9, there is illustrated a simplified schematic further explaining the operation of the incoming register, the relays of FIG. 9 being extracted from the circuitry shown in the said Drawing No. 4952-2261. In this step of the incoming register operation, relays nu and nz are activated. Thus, the contacts nu 1 to 5 and nz 3 to 7 are closed, and the two signals out of five in the B wires coming from line marker 24 corresponding to the called subscriber category or class will operate 2 out of five of the relays na, nb, nc, nd, ne. Through a matrix of contacts of 2 out of 5, relay nr (not illustrated) will be operated.

At the same time, the nr (not illustrated) relay when operated will cause the progress of the following steps:

1. A zero volt potential is sent on the b wires that will cause the operation of the selectors in the line selectors area; this is usually referred to as the "connection order."

2. In this phase, this will cause the sending back of the A-3 signal.

After the A-3 has been sent back, the outgoing register of the other exchange (originating one) will discontinue sending the last figure of the called number because A-3 means to it that the incoming register has located the called party and the incoming register 22 is now going to send its line condition (B codes).

At this point, the originating exchange will send an extra figure in a new couple of frequencies just to get back as an answer the B signal (free, busy, etc.) corresponding to the condition of the called line in a manner well known and defined in any conventional register signaling system of the CITT for R-2 systems.

Figure 3:
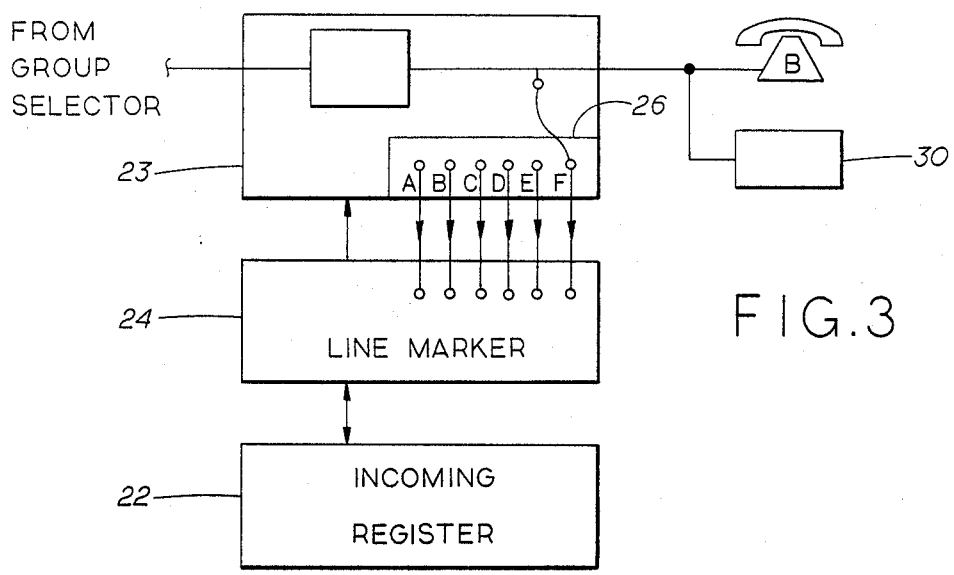
FIG. 3 is a block diagram, schematic view of the system according to the present invention.

Referring now to FIG. 3, the exchange 25 associated with telephone B has been modified or programmed in the incoming register to recognize that telephone B is a special class of subscriber, which, for purposes of illustration, is connected to terminal 26F. A special unit 30 is connected to the telephone lines on the premises of the telephone B. The special unit 30 is described in more detail hereinafter. Suffice it to say at this point, that when telephone A calls telephone B, the line marker 24 informs the incoming register 22 as usual about the subscriber class of the called party, and when incoming register recognizes this special class, instead of the incoming register sending back an A-3, a first A-5 signal is sent back to the outgoing register 13 illustrated in FIG. 1, and sequentially thereafter, because of the new programming mentioned before, the incoming register will cause the premature closing of the switching between group selectors and subscriber B, leaving ready the speech path and releasing itself from the process of the call.

So, when the outgoing register 13 answers to the A-5 signal as it would do with toll transit exchanges, the first digit of the information from the outgoing register will pass through the B exchange, reaching the special unit 30 which is produced and programmed to behave in the same manner as if it were an incoming register of a toll transit exchange. The special unit 30 itself then continues to send a series of "A-5's" back to the outgoing register 13 until all of the digits of telephone A are received by the special unit 30, which are displayed for the user of telephone B. In summary, the incoming register 22 will send the first A-5 signal back to the outgoing register, and then release itself from the system. The switching network will connect the special unit 30 to the outgoing register, thus allowing the unit 30 to send a series of A-5 signals back to the outgoing register until all of the digits of telephone A have been sent to the special unit 30.

Referring again to FIG. 9, there is illustrated the simplicity of modifying the incoming register 22 of FIG. 3 involved in these operations and commented in these points. Dashed lines represent the modifications to be introduced in it.

Referring now to the sector 300 of FIG. 9, a strap 301 is placed between ck3 and the input to cm relay. A strap 302 would be placed between ck6 and the c1 relay, if the telephone B were a common subscriber. In sector 400, no wiring changes are necessary. In sector 500, a single wire 501 is added between the contact of cm1 and the input of relay id. Two wires are used in sector 600, a first wire 601 to ground and a second wire 602 to the coil of relay cr.

In sector 700, the lines 701 and 702 are programmable strap wires. In sector 800 of FIG. 9, the opening contact of relay id4 is inserted in the circuit of the fn relay between the coil and the contact of fm4. Another closing contact of relay id will change the course of the operating potential coming from fm4, thus causing relay hi to operate instead of relay fn.

In the operation of the modified incoming register in accordance with FIG. 9, when the telephone number of telephone B comes into the exchange 25, the line marker 24 will cause the relays na to ne to be activated as illustrated in sector 400. This causes the relay ck to be activated, and going through the contact ck3 of sector 300 to activate cm relay. Thus, when the telephone B is recognized by line marker 24 as the special class of subscriber, thus activating relays na to ne, and thereby causing the cm relay to cause the activation of the id relay, this causes the cr relay through its cr1 and cr2 contacts to cause the send back of the first A-5 signal. At the same time, relay hi is activated by the combination of the id3 and id4 contacts, thus causing the release of the incoming register 22.

One embodiment of the invention will now be described by way of example with reference to FIG. 4 which is a block diagram of the special detector unit 30 used in the system of the invention. Only the essential circuits are indicated.

The telephone network is represented schematically by block 40 and is coupled to the detector by the double connecting lines 41 and 42. The telephone network includes the switching exchanges and the subscriber set B.

Auxiliary circuits without a basic function have been eliminated to simplify the drawing for the purpose of this description.

Connecting lines between blocks acting as signal paths have been indicated by continuous lines when they are fixed or by dotted lines when they are only temporarily established.

The control unit of the identification detector is represented by the frame outlined with a broken line 44. Only its basic blocks and connecting lines are represented. The receiving/transmitting lines between the control unit 44 and the remaining blocks have been indicated as starting/ending at the control unit without additional detail, as the remaining circuits of the control unit are not relevant for the purpose of this initial description.

Figure 4:
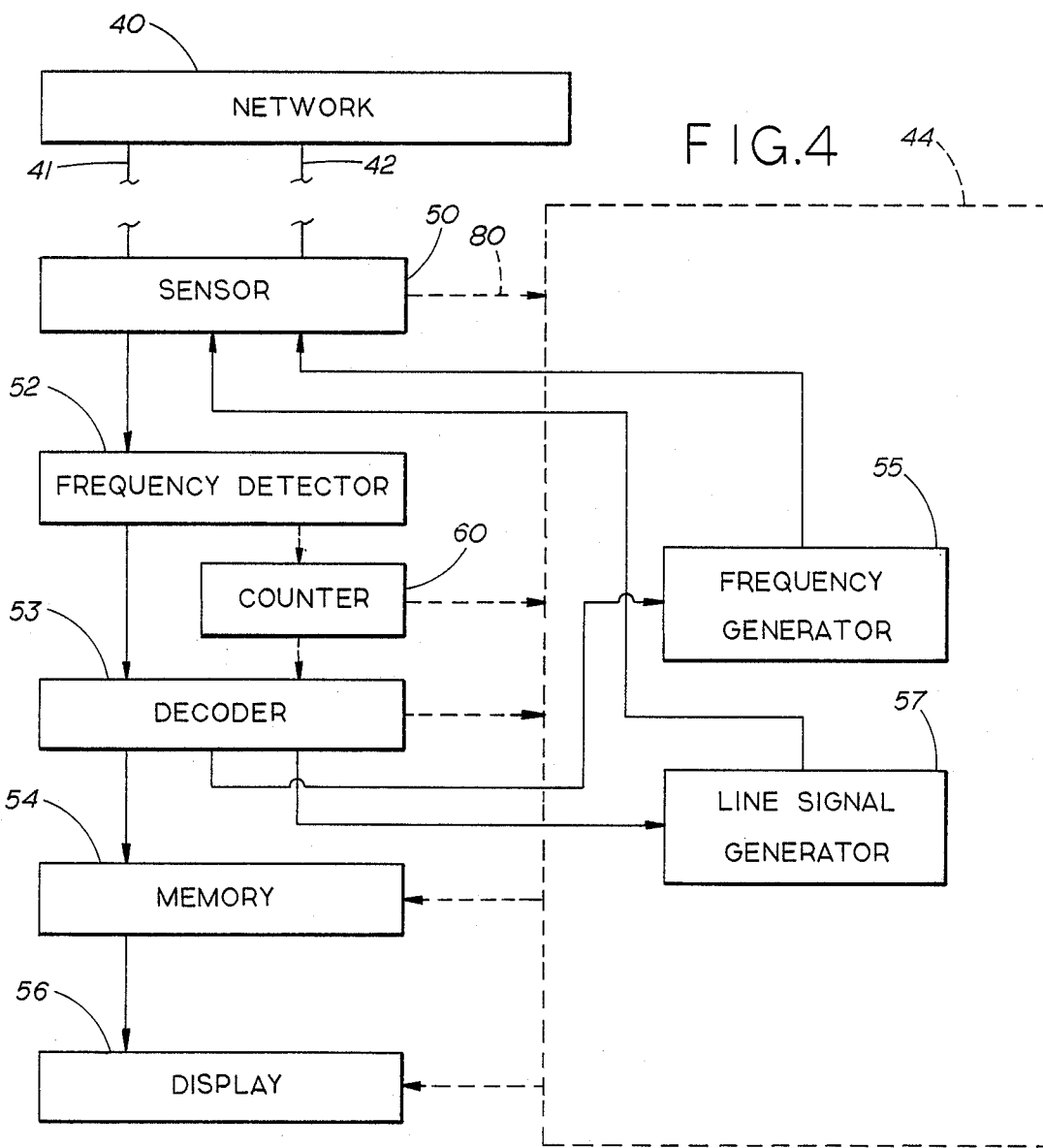
FIG. 4 is a block diagram, schematic view of the special detector unit in accordance with the present invention.

The special detector unit 30 is represented by the block diagram of FIG. 4. The special unit 30 is preferably located on the premises of the telephone B, generally in the same housing as the telephone instrument. If desired, however, by using special line cards at the exchange, all of the functions of the unit 30 except for the display can be installed at the exchange leaving only the display unit on the premises of telephone B. In any event, the unit 30, whether split physically into two or more segments, is connected to the lines of telephone B, and can be series or shunt-connected to the subscriber line depending on the final use of the detector.

The special detector unit 30 is supplied with power by way of a connection to the main supply or it can have its own power source incorporated, such as batteries or accumulators. It is also possible to supply it with power directly from the local exchange, specially in those cases where the detector is incorporated in the subscriber set.

Referring further to FIG. 4, block 50 represents an input sensor which senses the position of the subscriber set, that is, if the receiver is hung up or in use. When a call is made from the subscriber set, this sensor 50 also isolates the detector from the subscriber line to eliminate any possibility of interference.

At the local exchange, any line where an identification detector is desired to be connected is designated with a special category, which allows the control unit of the exchange to differentiate those lines equipped with a detector from the rest. This special designation serves at the same time to eliminate the possibility of a detector being installed without the knowledge of the telephone operating company. If a detector is connected to a regular subscriber line, it does not operate and neither is the line affected in any way.

When a call is received which is addressed to a subscriber line designated with a special category, that is, where a detector unit 30 has been connected, the switching operations do not finish with the selection of the called line, as the exchange has been programmed to disengage its control unit from the calling process after sending a signal to the exchange where the call originated, requesting the category and identification number of the calling station. At the same time as the local exchange where the call is received disengages its control unit from the calling process, the calling tone and current for the caller and called party are not sent or are cancelled, depending on the particular type of exchange involved in the process, and the identification detector is connected directly with the exchange of origin. In other words, and using standard telephone terminology: the telephone exchanges of the network are programmed in such a way that when a call is received addressed to a called station designated with a special category, instead of sending a signal indicating that the called line has been localized, or located, and changed to a code containing information about the line situation (A-3 signal), for example whether it is free, engaged, inoperative or the like, the control unit of the exchange sends back a signal requesting the category and identification number of the calling party (A-5 signal), disengaging at the same time its control unit from the calling process without sending the tone and calling current for the caller and called party, or cancelling them, and connecting the detector directly with the exchange of origin, or with the last exchange having control and data of the progress of the call.

If the calling and called parties belong to the same local exchange, the process is similar but the input and output control units now correspond with the same exchange.

The exchange of origin might be the local exchange of the calling party or an intermediate tandem exchange in special cases, for example, in international calls if two countries have no previous agreements to allow automatic call tracing, in the case of old type exchanges which are not prepared to send the calling station identification or in some other special cases.

During the whole process of calling station identification, there is no signaling present in the telephone network other than the standard telephone signaling, as the whole process does not respond to any strange signaling, but is based on the disengagement of the control unit of the receiving exchange and the transfer of the control process to the identification detector.

As a result of the signal received by the exchange of origin requesting the category and identification number of the calling station (signal A-5), its control unit sends category digit of the calling line to the detector connected to the called station. This category is coupled to the frequency detection circuit 52, where the frequencies are identified and then decoded by the decoder 53, recognizing the number sent by the exchange of origin as the category of the calling line. Once this number has been identified and checked, it is entered in the memory 54 and a new identification requesting signal is sent back (A-5 signal, in MF code generally called 2 in 5), but this time the signal comes from the frequency generator 55 of the identification detector and not from the control unit of the local exchange. The signal sent confirms to the exchange of origin the receipt of the category and requests the first figure of the calling station number. From this moment on, the exchange of signals between the detector and the telephone exchange of origin continues according to CCIT recommendations existing at the time and concerning signaling between telephone exchanges. The identification detector receives each figure and returns an identification request signal (A-5) until all the figures identifying the calling station have been sent and received by the detector.

When the last figure is received, the detector sends another A-5 signal which is answered by the exchange of origin with a new signal indicating the end of the identification number of the calling party (signal 1-15). This signal is now answered by the detector with a signal indicating that the line has been localized and changes to another signal code containing information about the situation of the line (signal A-3 and code B). Simultaneously, the memory is blocked, as any further information that might be sent by the exchange of origin is not relevant for the identification of the calling station number.

The A-3 signal indicates to the exchange of origin that the call has now been processed and completed. The identification detector, after receiving and identifying again the category of the calling line, sends back a signal indicating the situation of the line and the category of the called line (signal B). The control unit of the exchange of origin now accepts the call as completed and disengages itself, closing the conversation path and passing the control of the call to the junctor circuit which establishes the conversation path between the two subscribers. Moreover, the identification detector, after sending the last signal B, finishes the call control process and changes to the phase of reading the memory and transferring the information to a display panel, magnetic tape or similar system 56. It shows the category and identification number of the calling party and, at the same time, it sends through the line the calling tone for the caller and the call signal or current for the line signal generator 57, which operates a loudspeaker or bell to advise the subscriber that a call has been received. When the call is answered, that is, when the receiver is picked up, sensor 50 sends a signal to its control unit 44 indicating that the call has been answered and this control unit 8 disconnects the line signal generator 57.

If a display panel is used, as represented by block 56, it will be switched off when the receiver of the subscriber set B is replaced. In all cases the information received, category, area code, country code, if applicable, and individual identification number of the calling station, is maintained in the memory 54, from where it can be retrieved at any moment and transferred again to the display 56, to a printer or to any other peripheral equipment that might be connected to the detector. It can also be erased from the memory upon receiving a new call to allow entry of the new number, as in the case of low priced units with limited memory capacity.

In certain types of telephone networks, it might happen that the local exchange of the calling station will not send the identity of the calling party. For example, in a country with several independent telephone operating companies, one of them might not adopt the system of calling line identification simultaneously with the rest. A similar situation may be encountered with international calls where the necessary agreements between countries might not have been made. Also, it could occur that some old exchanges might not be equipped to return the identity of the calling line. As the call must be processed and contemplated, in all cases the invention provides alternatives:

The network of telephone exchanges is programmed in such a way that when a particular exchange does not send the identification number of the calling party, the detector can receive a repeated figure, which, through the counter circuit 60, is accepted as the identification number of the calling party once a number of figures equivalent to those of a regular calling station is received. For example, the outgoing register, even though not having the caller identified, can generate a series of ten ones (1's) which are counted by the counter 60. This can then be used to generate an error code for display on the display 56, and allow the call to be completed.

Alternatively, the detector can be internally programmed to complete a call upon receipt of a signal from the outgoing register of an unidentified calling party (signal 1-12).

From the previous description, it can be clearly deduced that by designating a subscriber line with a special category, it is possible to program a network of telephone exchanges in such a way that without using any other signaling than its own control signaling, the identity of a calling station can be sent to an identification detector connected to the receiving line.

No additional alternative routes are required, nor does any equipment need to be installed at the telephone exchanges. Moreover, the whole identification process is started automatically without requiring any special signals foreign to the network's own signaling to start the calling line identification process.

The invention is also based on the fact that the local exchange of the called station, upon sensing the special category with which the called station has been designated, is programmed to disengage its control unit from the calling process and to pass it over to the identification detector, which takes over the function of the end telephone exchange until the complete identification of the calling line has been received. The identification detector not only has the capacity to replace the operation of the end exchange, but is also composed of a set of complementary circuit blocks that allow it to receive and store the identification information, complete the call in those cases where the exchange of origin does not send the calling station identification, disengage itself from the called line once the identification is complete and show the identification of the calling station received on a display or transfer it to a magnetic tape, or print it or use it in any other convenient way.

The ingenuity and simplicity of the invention described finally allows one to design and produce identification detectors of low price and small dimensions that can be integrated in the subscriber set as a standard feature.

Finally, the calling line tracing system and identification detector described can be applied to any kind of network composed of different types of telephone exchanges and without any limitation of distance between calling and called station, all of this being possible because the system according to the invention only operates with standard telephone signaling as per CCITT recommendations.

In exchanges using signal systems other than R-2, they would operate in a similar manner with minor modifications to relay circuits or equivalent terminating class mark software commands in computer controlled switching machines. It should be appreciated that R-1 systems are similar to R-2, except that the back signals are supervisory (off/on hook) in nature instead of paired frequencies and that reverse signals are not required between digits (or characters) of individual strings.

Moreover, common channel signaling systems are also similar to R-1 and to R-2, inasmuch as all three types use forms of back signaling, but the transmission of signals is not accomplished via the same path as the speech between switching centers, as would be the case in R-1 and R-2 systems, and, in addition, is encoded.

FIGS. 5, 6, 7 and 8 illustrate in more detail the individual circuitry which can be used in the special detector unit 30. The diagrams shown, though corresponding to an actual detector, in no way imply any limitation. Considerations such as price or physical size are disregarded as far as the shown circuit is concerned.

With reference to FIG. 5, which illustrates in greater detail the sensor circuit 50 of FIG. 4, when the receiver of telephone B is in the hung up condition, transistor Q3 is saturated and sends a 0 logic level to the control citcuit of the detector. Upon lifting the receiver, closing the line circuit, the line voltage drops and cuts off transistor Q3 and the control unit of the detector receives a logic level 1 through resistor R2 via line 80.

A voltage reversal will also be sensed by transistor Q3, provided it lasts for a sufficient time to allow the operation of transistor Q3, the result being to reset the detector.

FIG. 5 also shows two amplifiers working, one of them as a balanced amplifier 82 and the other as reversing amplifier 84. Field effect transistor Q4 will decrease its feedback resistance when the output signal of the circuit increases, thus providing automatic gain control. The automatic gain control signal passes through potentimeter R5 and one of the automatic electronic switches 89 (only one is shown in the diagram though there will be as many as required) going to the frequency detectors through the terminal 91.

MF signals generated pass through circuit switch 88 provided the electronic switches are activated. An oscillator is shown in circuit 90. Both circuits 88 and 90 are only partially shown. Reference number 92 is a transmission amplifier, though in FIG. 5 it is only partially represented, and its output impedance will be balanced to the line impedance and the transmission level will be regulated though potentiometer R9 and the detector power supply. In operation, the incoming pair of telephone lines to telephone B are connected directly to terminals 1 and 2. The received signals on terminals 1 and 2 will then, after passing through the amplifiers and the automatic gain control, pass to the terminal 91, which coincides with terminal 91 of FIG. 6.

In another aspect of FIG. 5, the plurality of oscillators 90 constitute the frequency generator 55 of FIG. 4. The electronic switches 85 (only one being illustrated) are determinative of which pair of generated frequencies are transmitted back. The inputs to the electronic switches, i.e., the terminals 201, 202 and 203 coincide with the terminals 201, 202 and 203 of FIG. 8. The terminal 301 connected to the line signal generator 57 corresponds to the terminal 301 shown in FIG. 8.

Figure 6:
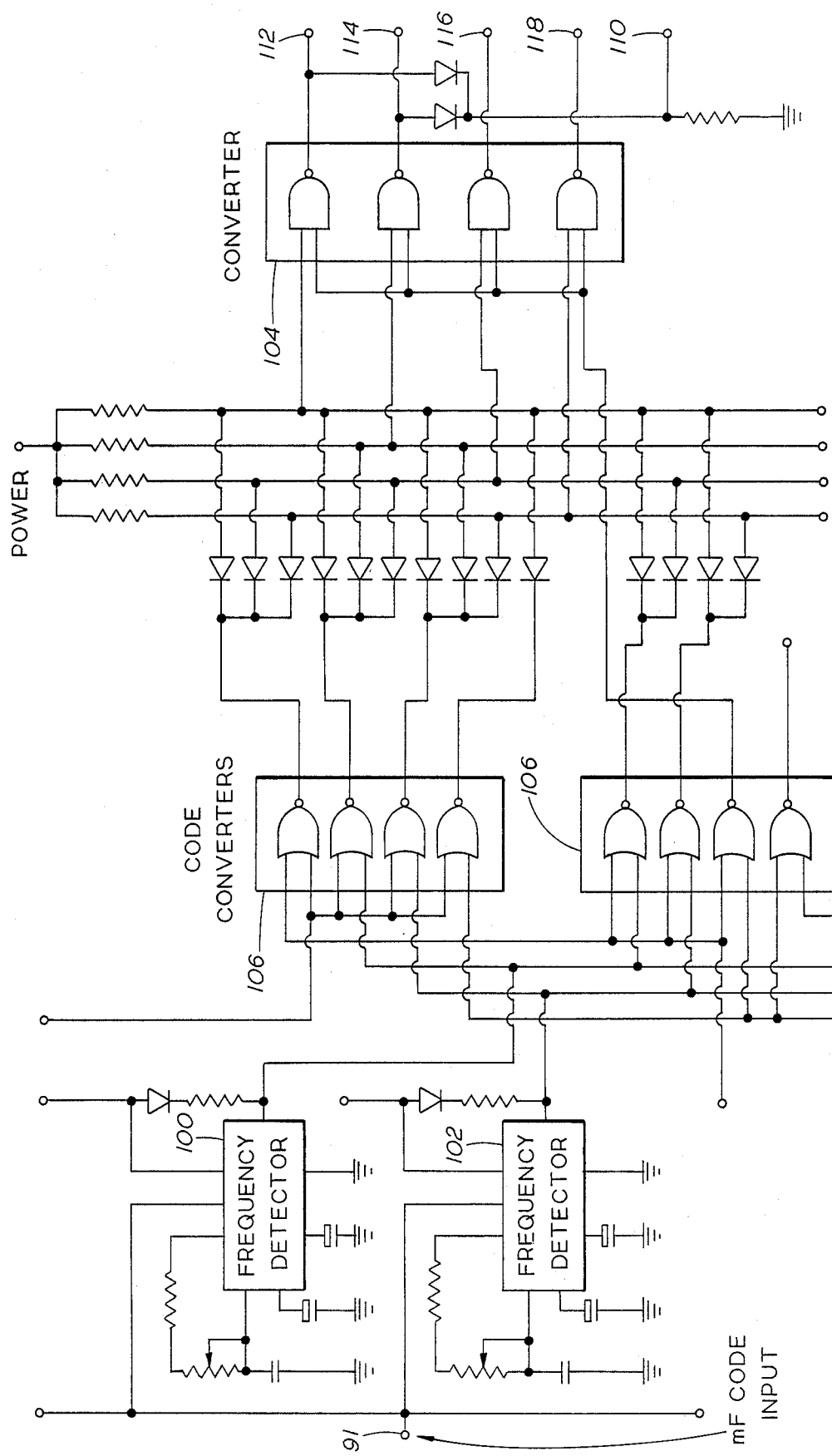
FIG. 6 schematically illustrates the frequency detector and decoder circuits of FIG. 4.

FIG. 6 shows the circuit that will receive the MF code (for example, a 2 in 6 code), and convert this code into a binary code. Only two frequency detectors are shown formed by integrated circuits 100 and 102 with attached passive components and converters 104, and are driven by the signals applied to terminal 91. Code converters, of which only two are shown, are designated by 106, and are used in this particular embodiment to convert to a BCD coding. In general, there will be as many as required or a singular one with a sufficient number of input/output terminals as is required.

FIG. 6 also shows the generator of strobe signals, such as I-15 of a European signaling system, through terminal 110. Lines 112, 114, 116 and 118 correspond to the same numbers in FIG. 7.

Figure 7:
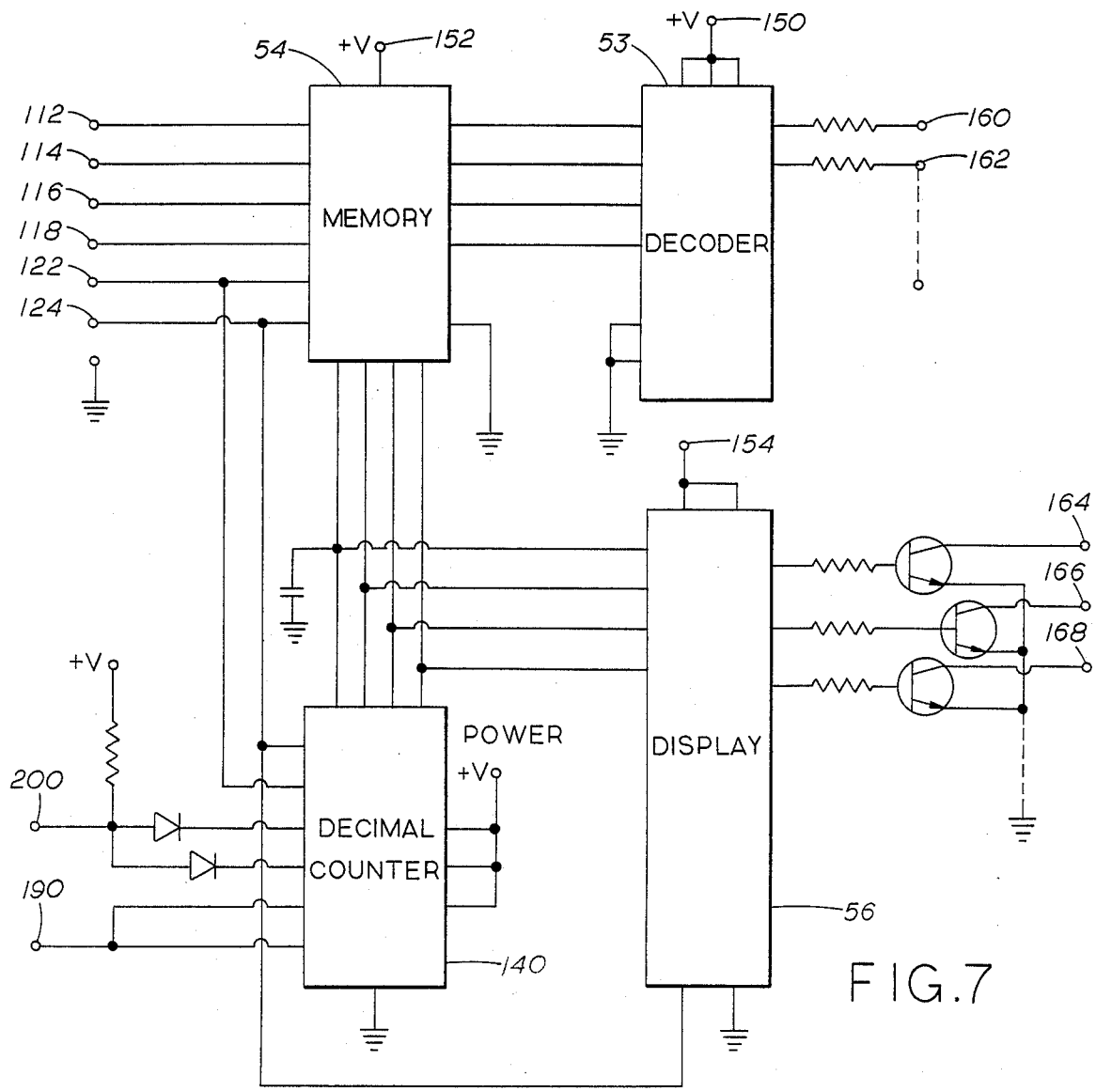
FIG. 7 schematically illustrates the memory and display circuitry of FIG. 4.

In FIG. 7, block 54 represents the memory unit of the detector. Command inputs will correspond to 112 and 124. The memory will store the code converter signals received through lines 112, 114, 116 and 118 from FIG. 6. Block 53, also shown in FIG. 4, represents a decoder. In this particular case, it is assumed that the peripheral used is a seven segment display unit with as many numerals as required, generally ten. Also in FIG. 7, block 140 is a decimal counter and block 56 a display unit. Reference numerals 150, 152 and 154 are power supply inputs and reference numerals 160, 162, 164, 166 and 168 are the connections to the LEDs used in the display 56.

Figure 8:
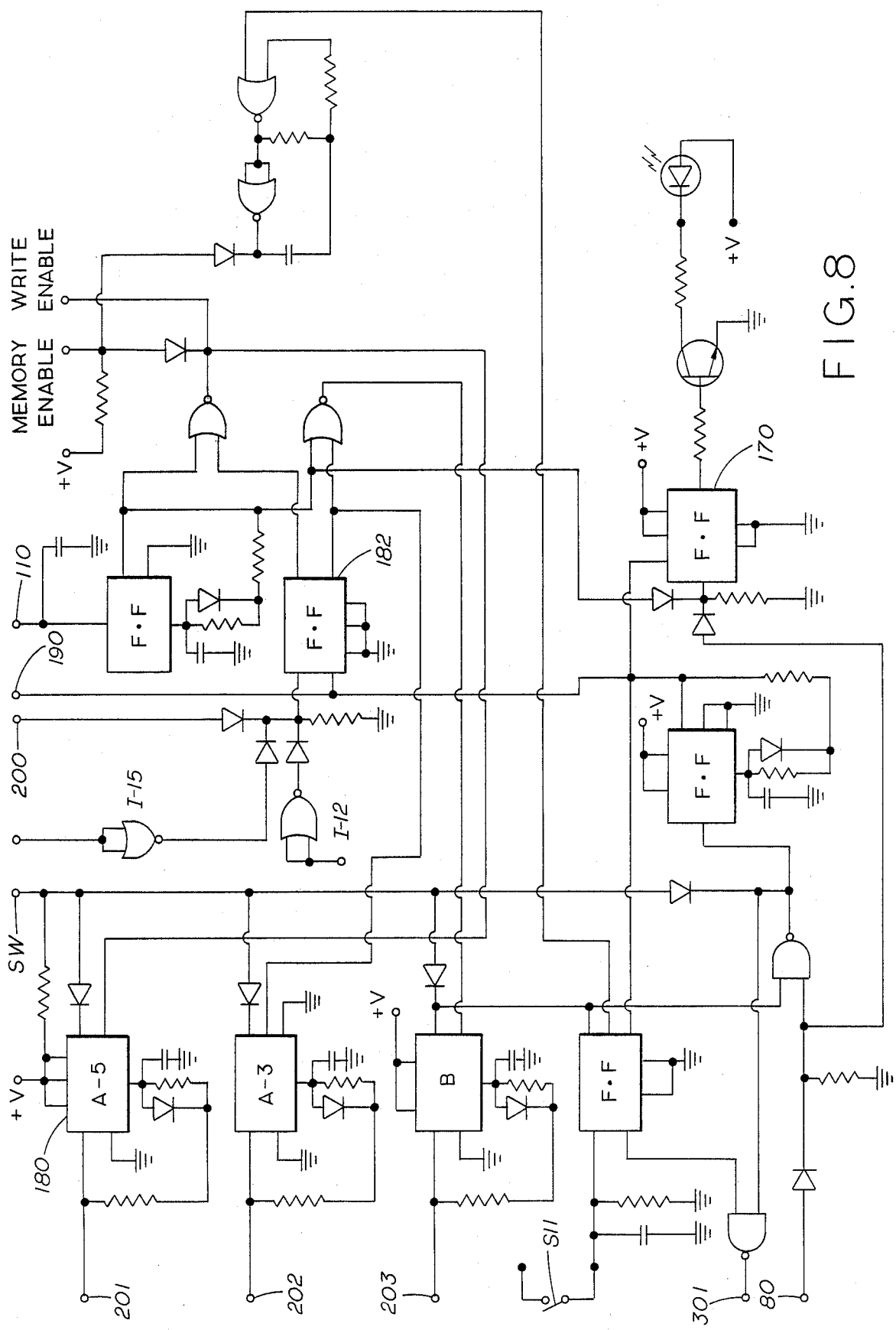
FIG. 8 illustrates, schematically, the control circuitry of FIG. 4.

In FIG. 8, the strobe signal, through connection 110, energizes circuit 170 to generate a pulse to command the memory storage, and also to generate signals through circuits 180 and 182. The circuitry 180 causes the A-5 signal to be transmitted. The reset signal is received through connection 190 it can be manually generated through switch S11. Line 80 is connected to the line sensor.

Signal 200 is an international call or a long distance call where the calling party identification is not received. Counter circuits and timer circuits are required in some cases to complete the call, as indicated in the previous description, are not shown in the diagrams. The corresponding signal through 200 will, however, allow completion of the call.

The basic circuitry shown in FIGS. 4-8 describes only one possible way to actually build a detector. Present levels of electronic integration allow production of extremely small detectors through custom designed ICs, which allow production of extremely small detectors which enable inclusion of the detector as part of the subscriber set, powered directly from the local telephone office or exchange.

The ingenuity and simplicity of the invention described allows one to design and produce identification detectors of low price and small dimensions which can be integrated into the subscriber set as a standard feature.

Finally, the calling line tracing system and identification detector described can be applied to any kind of network composed of different types of telephone exchanges, without any limitation of distance between calling and called station. This is possible because the invention only operates with the standard telephone signaling used in the particular telephone network where it is to be installed, being usable for international calls and subject only to the corresponding previous agreements among governments or telephone operating companies.

Many variations and modifications to the foregoing preferred embodiments will become obvious to those skilled in the art from the reading of this specification. For example, if preferred, the functions of the special identification detector unit 30 can be physically divided, such that a special line card having the detection, signaling and control functions can be located at the central office of the exchange, while leaving the memory and display functions at the terminal location, i.e., on the premises of the called telephone station. Moreover, in yet another variation, the special identification detector device can be located in the central office of the telephone exchange for use by a telephone operator. In such a system, one of the other conventional aspects of the exchange, for example, the incoming register, or any other part of the common control in the exchange capable of sending back signals, can initiate the back signaling process to request identification of the calling number, and then disengage and transfer the subsequent back signaling process to the identification device, if required, after closing the switching path in the exchange in the proper connection order.

What is claimed is:

1. A method within a telephone network, having calling signals therein, for detecting and identifying the number of a first telephone station served by a first telephone exchange calling a second telephone station served by a second telephone exchange, comprising the steps of:
   (a) causing the second exchange to send a first back signal as part of a back signaling process to the first exchange to initiate a request for identification of the first telephone station;
   (b) disengaging the said second exchange from the back signaling process; and
   (c) causing an identification detector device located on the premises of said second telephone station, as part of the back signaling process, to send additional back signals to said first exchange to complete the said request for identification of said first telephone station.

2. The method according to claim 1, including in addition thereto, the step of causing the said second telephone exchange to first identify the said second telephone station as having a specific terminating class mark, prior to sending the first back signal to the said first exchange to initiate the request for identification of the said first telephone station.

3. The method according to claim 1, including the additional step of causing the identification detector device to control the said calling signals of the said second telephone station.

4. The method according to claim 3, wherein said calling signals comprise ringing signals.

5. A method within a telephone network for detecting and identifying the number of a first telephone station served by a first telephone exchange calling a second telephone station served by a second telephone exchange, said first and second telephone exchanges being integral parts of said telephone network, comprising the steps of:
   (a) causing the second exchange to send a first back signal to the first exchange to initiate a request for identification of the said first telephone station; and
   (b) causing an identification detector device located on the premises of said second telephone station to send an additional back signal within the said telephone network to complete the said request for identification of the said first telephone station.

6. The method according to claim 5, including in addition thereto, the step of causing the said second telephone exchange to first identify the said second telephone station as a specific terminating class mark prior to sending the first back signal to the said first exchange to initiate the request for identification of the said first telephone station.

7. An identification detector device for use with a telephone network having standard network frequency signals in which a first telephone station, having certain identifying characteristics, served by a first telephone exchange is calling a second telephone station served by a second telephone exchange, wherein said second telephone station has a receiver, comprising means for receiving signals from the network and for selecting the standard telephone frequency signals, means for decoding any signals so selected into characters representative of the said characteristics of the first telephone station, means for storing said characters representative of the said characteristics, means for generating telephone frequency signals and for transmitting same to the first station exchange to acknowledge receipt of said selected signals identifying the first telephone station and means arranged, after identification of the first telephone station, for generating a ring back signal for transmission to the first calling telephone station and a ringing signal for the second called telephone station.

8. A system for providing caller number identification to the premises of a called telephone station, comprising a called telephone station on given premises; a terminating telephone exchange within a telephone network serving said called telephone station; an identification detector device located on said given premises; means within said telephone exchange to identify said called telephone station as having a specific terminating line mark; means responsive to the identification of said called telephone station as having a specific terminating line mark to allow the said identification detector device to accept standard network signaling.

* * * * *

UNITED STATES PATENT AND TRADEMARK OFFICE
CERTIFICATE OF CORRECTION

PATENT NO. : 4,754,475
DATED : June 28, 1988
INVENTOR(S) : Jose P. Pintos et al

It is certified that error appears in the above-identified patent and that said Letters Patent is hereby corrected as shown below:

In column 5, line 16, delete "called" and insert therefor --call--.

In column 7, line 27, delete "c1" and insert therefor --cl--.

In column 12, line 3, delete "citcuit" and insert therefor --circuit--.

In column 12, lines 16-17, delete "potentimeter" and insert therefor --potentiometer--.

In column 13, line 8, delete "190 it" and insert therefor --190. It--.

In column 14, line 24, delete the first occurrence of "the said".

Signed and Sealed this

Eighth Day of November, 1988

Attest:

DONALD J. QUIGG

*Attesting Officer*  *Commissioner of Patents and Trademarks*